United States Patent
Futamoto et al.

(10) Patent No.: US 6,607,849 B2
(45) Date of Patent: Aug. 19, 2003

(54) MAGNETIC RECORDING MEDIUM AND MAGNETIC RECORDING APPARATUS USING THE SAME

(75) Inventors: Masaaki Futamoto, Kanagawa-ken (JP); Nobuyuki Inaba, Hasuda (JP); Yoshiyuki Hirayama, Kodaira (JP); Yukio Honda, Fuchu (JP); Kazuetsu Yoshida, Hidaka (JP); Kenya Ito, Hachioji (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/126,780

(22) Filed: Apr. 22, 2002

(65) Prior Publication Data

US 2002/0160233 A1 Oct. 31, 2002

Related U.S. Application Data

(63) Continuation of application No. 09/947,411, filed on Sep. 7, 2001, which is a continuation of application No. 09/594,570, filed on Jun. 15, 2000, now Pat. No. 6,447,936, which is a continuation of application No. 09/379,462, filed on Aug. 24, 1999, now Pat. No. 6,403,203, which is a continuation of application No. 09/085,861, filed on May 28, 1998, now abandoned.

(30) Foreign Application Priority Data

| May 29, 1997 | (JP) | 9-139655 |
| Jun. 3, 1997 | (JP) | 9-144835 |
| Sep. 30, 1997 | (JP) | 9-265445 |

(51) Int. Cl.$^7$ .............. G11B 5/66; G11B 5/70
(52) U.S. Cl. .............. 428/694 TM; 428/216; 428/336; 428/900
(58) Field of Search .............. 428/694 TM, 216, 428/336, 900

(56) References Cited

U.S. PATENT DOCUMENTS

| 5,041,922 A | | 8/1991 | Wood et al. ............ 360/55 |
| 5,576,085 A | * | 11/1996 | Lal et al. ............ 428/65.3 |
| 5,665,468 A | | 9/1997 | Sekiya et al. ............ 428/332 |
| 5,750,270 A | | 5/1998 | Tang et al. ............ 428/611 |
| 5,763,071 A | | 6/1998 | Chen et al. ............ 428/332 |
| 5,815,342 A | | 9/1998 | Akiyama et al. ............ 360/97.01 |
| 5,843,565 A | * | 12/1998 | Davies et al. ............ 428/212 |
| 5,851,643 A | | 12/1998 | Honda et al. ............ 428/212 |
| 5,966,348 A | | 10/1999 | Hashimoto et al. ............ 369/13 |
| 5,976,688 A | | 11/1999 | Kawase et al. ............ 428/332 |
| 6,043,947 A | * | 3/2000 | Gooch et al. ............ 360/66 |

FOREIGN PATENT DOCUMENTS

| JP | 58-77025 | 5/1983 |
| JP | 58-141435 | 8/1983 |
| JP | 60-644413 | 4/1985 |
| JP | 60-214417 | 10/1985 |

* cited by examiner

Primary Examiner—Holly Rickman
(74) Attorney, Agent, or Firm—Kenyon & Kenyon

(57) ABSTRACT

Magnetic recording medium includes at least two layers having different magnetic anisotropy constants formed on a substrate and the perpendicular magnetic anisotropy of the second magnetic film of those magnetic films, far from the substrate surface, made equal to or larger than that of the first magnetic film near to the substrate surface, thus improving the magnetic isolation.

2 Claims, 8 Drawing Sheets

MAGNETIC RECORDING MEDIUM AND MAGNETIC RECORDING APPARATUS USING THE SAME

This application is a continuation of U.S. patent application Ser. No. 09/947,411, filed Sep. 7, 2001, which is a continuation of U.S. patent application Ser. No. 09/594,570, filed Jun. 15, 2000, now U.S. Pat. No. 6,447,936, which is a continuation of U.S. patent application Ser. No. 09/379,462, filed Aug. 24, 1999, now U.S. Pat. No. 6,403,203, which is a continuation of U.S. patent application Ser. No. 09/085,861, filed May 28, 1998, now abandoned which are incorporated herein by reference in their entirety.

FIELD OF THE INVENTION

The present invention relates to perpendicular magnetic recording medium which are small in read back noise and suitable for high-density magnetic recording, and to a magnetic recording apparatus using these media.

BACKGROUND OF THE INVENTION

The currently used practical magnetic recording system is the longitudinal magnetic recording system in which magnetic recording is made in parallel to the surface of the magnetic recording medium, and so that the magnetic N-poles are opposed one to one and that the magnetic S-poles are opposed to one to one. In order to increase the linear recording density in the longitudinal magnetic recording, it is necessary that the coercivity be increased by decreasing the product of residual flux density (Br) and magnetic film thickness (t) of the magnetic film of a recording medium to reduce the effect of the demagnetizing field at the magnetic recording process. In addition, to decrease the medium noise caused by magnetization transition, it is necessary to orient the magnetic easy axis of the magnetic film in the direction parallel to the substrate surface, and to control the crystal grain size. To control the crystal orientation and grain size of the magnetic thin film, an underlayer for structure control is formed between the substrate and the magnetic film.

As the magnetic film, a Co-based alloy thin film is used which chiefly contains cobalt Co, and has an element such as Cr, Ta, Pt, Rh,.Pd, Ti, Ni, Nb, Hf added to the cobalt. The Co-based alloy of the magnetic thin film is chiefly made of a material of hexagonal closed packed structure (hereinafter, referred to as hcp structure). The magnetic easy axis is present in the directions of c-axis, <0, 0.1> and is oriented in the longitudinal direction. An underlayer for structure control is formed between the substrate and the magnetic film in order to control the crystal orientation and grain size of the magnetic film. The underlayer is made of a material which chiefly contains Cr and has an element of Ti, Mo, V, W, Pt, Pd added to Cr. The magnetic thin film is formed by vacuum evaporation or sputtering. As described above, the product of residual flux density (Br) and magnetic film thickness (t) of the magnetic film is required to be reduced in order to reduce the medium noise in the longitudinal magnetic recording and to thereby increase the linear recording density. For this purpose, it has been considered that the magnetic film thickness is reduced to 20 nm or below, and that the crystal grain size is greatly reduced. However, such medium has a very important problem that the recording magnetization is reduced by thermal instability. This phenomenon interferes with the high density recording.

The presently used magnetic disk recording apparatus is of the longitudinal magnetic recording system. The technical subject is that the longitudinal domains parallel to the substrate are formed at high density in the longitudinal magnetic recording medium which is easy to be magnetized in the direction parallel to the disk substrate surface. A method of increasing the recording density in the longitudinal magnetic recording medium is proposed, which employs keepered media formed by depositing an extremely thin soft magnetic film on the recording medium that have the magnetic easy axis in the longitudinal direction.

This technique is described in Abstracts, page 116 (paper No. DQ-13) and pages 133–134 (paper No. EB12) published in the 41st Annual Conference on Magnetism & Magnetic Materials (Nov. 12–15, 1996).

In such documents, it is described that if this media structure is employed it will be possible to increase the longitudinal magnetic recording density to 1 Gb/in2 or above by use of thin film heads of self-recording/reproduction system. In the longitudinal recording system, however, since the adjacent recorded bits are substantially magnetized to oppose to each other, magnetization transition regions of certain widths are formed across the boundaries even when this technique is employed. Thus, it will be technically difficult to record at a longitudinal density of 5 Gb/in2 or above.

On the other hand, the perpendicular magnetic recording system forms domains on the recording medium surface perpendicularly, and so that the adjacent recorded bits are unti-parallel to each other. This system has the advantage that the demagnetizing field at the boundary between the recorded bits is decreased, and thus it is one of the powerful means for high-density magnetic recording.

For the longitudinal high-density recording, it is necessary that the magnetic film be formed to have a thickness of 20 nm or below as described above. In this case, there is a problem that the recorded magnetization regions may be lost by thermal instability. On the contrary, the perpendicular magnetic recording system is able to form the magnetic film thicker than the longitudinal magnetic recording system, and thus stably maintain the recorded magnetization regions. In order to reduce the media noise generated from the magnetization transition and increase the linear recording density in the perpendicular recording system, it is necessary to orient the magnetic easy axis of the magnetic film perpendicularly to the substrate surface, and control the crystal grain size.

As the magnetic film, a Co-based alloy thin film is used which chiefly contains cobalt Co and has an element of Cr, Ta, Pt, Rh, Pd, Ti, Ni, Nb, Hf added to Co. The Co-based alloy of the magnetic thin film is chiefly made of a material of hexagonal closed packed structure (hereinafter, referred to as hcp structure). The magnetic easy axis is present in the directions of c-axis, <0, 0.1> and is oriented in the perpendicular direction. The magnetic thin film is formed by vacuum evaporation or sputtering. In order to increase the linear recording density at the time of recording and the read output and reduce the read back noise so that the magnetic recording characteristics can be improved, it is necessary to improve the perpendicular orientation of the c-axis of the Co-based alloy thin film and control the crystal grain size. Thus, it has so far been considered that an underlayer for structure control is formed between the substrate and the magnetic film.

The perpendicular magnetic recording system has attracted a great deal of attention as a system capable of high-density magnetic recording, and structure of medium suitable for the perpendicular magnetic recording have been proposed. A method of providing a non-magnetic underlayer between the perpendicular magnetization film and the substrate has been examined in order to improve the perpendicular orientation of the perpendicularly magnetized film made of a Co-based alloy material. For example, a method of depositing a Ti film as an underlayer for a Co-Cr magnetic film is described in JP-A-5877025, and JP-A-58-141435, a method of providing an under layer made of Ge, Si material in JP-A-60-214417, and a method of providing an underlayer made of an oxide material such as CoO, NiO in JP-A-60-064413. In addition, a magnetic recording medium having a soft magnetic layer of Parmalloy provided between the substrate and the perpendicular magnetization film has been considered as a perpendicular magnetic recording medium which is used in combination with a single-pole type magnetic recording head.

However, in order to achieve ultra-high density magnetic recording of several $Gb/in^2$ or above, particularly more than 10 $Gb/in^2$, it is important to reduce the noise contained in the read output signal, particularly the medium noise caused by the micro-structure of the medium in addition to the improvement of the linear recording density. Thus, it is necessary to more highly control the thin film structure in addition to the crystal orientation of the magnetic film. The media noise has so far been tried to reduce by various ways. For example, these ways are (1) to segregate the nonmagnetic element Cr of CoCr-based alloy in the crystal grain boundary or grains in order to suppress the magnetic mutual action between the magnetic grains and (2) to isolate the magnetic grains in a form by controlling the sputtering gas pressure. The improvement in medium structure by these conventional techniques was effective in reducing the medium noise, but the reverse magnetic domains formed opposite to the magnetization direction and the associated magnetization irregularity, which cause the medium noise in the perpendicular magnetic recording, was not able to be reduced effectively.

The perpendicular magnetic recording medium capable of high-density magnetic recording of 5 $Gb/in^2$ or above is required to have small medium noise in addition to high linear recording density or resolution. There are some reported examples. As for example described in a paper titled "Improvement in S/N ratio of Single Layer Perpendicular Magnetic Disk Media" of the Fifth Perpendicular Magnetic Recording Symposium (Oct. 23–25, 1996), pp. 98–103, it is effective to decrease the thickness of the perpendicular magnetization film, introduce a non-magnetic underlayer of CoCr between the perpendicular magnetization film and the substrate, add a non-magnetic element such as Ta to the Co alloy magnetic film and/or reduce the magnetic crystal grain size. These countermeasures are able to considerably reduce the medium noise, but if the noise can be more decreased, the recording density of the magnetic recording apparatus will be easily increased much more.

Accordingly, it is an object of the invention to remove the drawbacks of the prior art, and provide perpendicular magnetic recording media having excellent—low-noise characteristics and suitable for ultra-high density magnetic recording by controlling the perpendicular magnetic anisotropy, crystal orientation or mutual action between the magnetic grains of the perpendicular magnetization film formed on the substrate to thereby control the fine domain structure magnetically recorded, and a magnetic recording apparatus using the medium.

According to the invention, the perpendicular magnetic recording medium having the low-noise characteristics can achieve high-density recording of 5 $Gb/in^2$ or above, and thus make it easy to produce high-density recording apparatus.

After examining the recorded magnetization structure of the perpendicular magnetic recording medium by a magnetic force microscope and a spin-polarized scanning electron microscope, it was found that most of the noise are caused by reverse magnetic domains and microscopic instability of magnetization present in the medium surfaces. In order to decrease the medium noise, it is necessary to reduce the reverse magnetization and microscopic instability of magnetization present in the medium surfaces.

SUMMARY OF THE INVENTION

It is an object of the invention to provide perpendicular magnetic recording medium having both low noise characteristics and high-density linear recording characteristic which enable the high-density magnetic-recording of 5 $Gb/in^2$ or above, and magnetic recording/reproducing apparatus using the medium.

According to the invention, at least two magnetic films which are different in perpendicular magnetic anisotropy are formed on the substrate, and in this case the perpendicular magnetic anisotropy of the second magnetic film on the side far from the substrate is made greater than that of the first magnetic film on the side near to the substrate surface, thereby improving the magnetic isolation of the first magnetic film on the side near to the substrate surface. That is, the above object can be achieved by assigning a different role to each magnetic film as they say.

After examining the recorded magnetization structure by a magnetic force microscope or spin polarized scanning electron microscope, it was found that most of the noise are caused by the reverse magnetic domains and microscopic instability of magnetization present in the medium surfaces. In order to decrease the medium noise, it is necessary to reduce the reverse magnetic domains and microscopic instability of magnetization present in the medium surfaces. To decrease the medium noise and assure high-density linear recording characteristics, it is desired to reduce the magnetic crystal grain size of the perpendicular magnetic recording medium and magnetically isolate the grains.

From the results of experiments by the inventors, it was found that the following media structure is effective in achieving the above object.

First, referring to FIG. 1, a single-layer type perpendicular magnetic recording medium is normally produced by depositing a perpendicular magnetization film 13 on an underlayer 12 which is formed on a non-magnetic substrate 11 for the purpose of improving the perpendicular orientation of the magnetic film and controlling the crystal grain size. On this magnetization film, there is usually deposited a protective film of carbon or the like. The magnetic film is made of a Co-based alloy containing at least one element selected from Cr, Ta, Pt, Pd, Si, V, Nb, W, Mo, Hf, Re, Zr, B, P, Ru. This magnetic film is a polycrystalline film, and for high density linear recording characteristic and low-noise characteristic, its crystal grain size is selected to be normally 20 nm or below, and a non-magnetic element is preferentially segregated in the crystal grain boundary. This perpendicular magnetization film has a small magnetic exchange coupling force in the longitudinal direction because the segregated layer exists in the crystal grain boundary.

The present inventors found that the effective way to further reduce the medium noise is to provide on the first perpendicular magnetization film 13 of Co-based alloy a second perpendicular magnetization film 14 of which the magnetic exchange coupling force in the longitudinal direction is greater than that of the first perpendicular magnetization film. The second perpendicular magnetization film 14 is preferably a multi-layered perpendicular magnetization film of Co/Pt, Co/Pd, Co alloy/Pt, Co alloy/Pd, Co alloy/Pt or Pd alloy or a noncrystal perpendicular magnetization film of Tb Fe Co containing rare-earth elements.

The deposition of the second perpendicular magnetization film 14 can reduce the magnetic instability present in the surface of the first perpendicular magnetization film 13. Since the second perpendicular magnetization film 14 has a large magnetic exchange coupling force in the longitudinal direction, the microscopic magnetic instability is not easily caused on the surface.

Here, in order to assure low-noise characteristics in the perpendicular magnetic recording medium, it is necessary to decrease the thickness of the second perpendicular magnetization film 14 as compared with that of the first perpendicular magnetization film 13. The thickness of the second perpendicular magnetization film is preferably selected to be less than ⅓ that of the first perpendicular magnetization film. The role of the second perpendicular magnetization film 14 is not to hold the perpendicular magnetic recording, but to greatly reduce the microscopic magnetic instability in the surface of the first perpendicular magnetization film 13. To assign this function to a thin film, it is more desirable to provide high magnetic anisotropy energy of $5 \times 10^6$ erg/cc or above. When the thickness of the second perpendicular magnetization film 14 is larger than that of the first perpendicular magnetization film 13, the medium noise is increased as compared with the case in which only the first perpendicular magnetization film is deposited.

In order to achieve a recording density of 5 Gb/in$^2$ or above, the total thickness of the first and second perpendicular magnetization films should be selected to be more than 7 nm and less than 100 nm. If the total thickness is larger than 100 nm, the magnetic crystal grains constituting the perpendicular magnetization films are enlarged in volume, and as a result the magnetic switching volume is also increased, thus causing large medium noise. Accordingly, it is not possible to achieve the signal to noise ratio for a recording density of 5 Gb/in$^2$ or above. If the total thickness is equal to or less than 7 nm, the recording magnetization is remarkably deteriorated by thermal instability.

The thickness of the second perpendicular magnetization film is preferably more than 3 nm and less than 10 nm. If it is equal to or less than 3 nm, the effect of reducing the magnetic instability in the surface of the first perpendicular magnetization film is unrecognizably small. If it is larger than 10 nm, the medium noise is increased.

The object of the invention can also be achieved by employing the structures shown in FIGS. 2 through 6. As to the structure shown in FIG. 2, the second perpendicular magnetization film 14 is deposited on the first perpendicular magnetization film 13 as in the case of FIG. 1, but between the first perpendicular magnetization film 13 and the non-magnetic substrate 11 there are formed an underlayer 23 of a nonmagnetic material having a hexagonal closed packed structure or a weak ferro magnetic material having a hexagonal closed packed structure of which the saturation magnetization is 100 emu/cc or below, and the underlayer 12 for controlling the crystal orientation of this underlayer film. Use of these dual-underlayer structure will enable the first perpendicular magnetization film to be highly controlled in its crystal grain size and orientation, and low-noise characteristics to be achieved.

The media structure, as shown by its cross section in FIG. 3, has the first and second perpendicular magnetization films 13, 35 stacked, and also has another perpendicular magnetization film 33 of multi-layered structure or non-crystal structure formed between the first perpendicular magnetization film 13 and the underlayer 12. Thus, the magnetic instability present in the front and back sides of the first perpendicular magnetization film 13 can be reduced, so that low-noise characteristics can be achieved.

The cross-sectional structures shown in FIGS. 4 through 6 are structures of perpendicular magnetic recording media of the type in which a soft magnetic layer is provided under the perpendicular magnetization film as indicated by reference numeral 42. In this case, the second perpendicular magnetization film 44 of multi-layered structure or amorphous-like structure is also provided on the first perpendicular magnetization film 13 of Co alloy.

Referring to FIG. 5, there is shown an underlayer film 53 having a non-magnetic hexagonal closed packed structure or a weak ferro magnetic hexagonal closed packed structure of which the saturation magnetization is 100 emu/cc or less. In FIG. 6, there is shown a perpendicular magnetization film 64 of multi-layered or amorphous structure.

The second perpendicular magnetization film of multi-layered or amorphous structure is formed on the first perpendicular magnetization film as shown in FIGS. 1 through 6. This second perpendicular magnetization film serves to reduce the microscopic magnetic instability present in the surface of the first perpendicular magnetization film. The perpendicular magnetization film of multi-layered or non-crystal structure formed under the first perpendicular magnetization film as shown in FIGS. 3 and 6 acts to reduce the microscopic magnetic instability present in the lower surface of the first perpendicular magnetization film.

The underlayer 12 in FIG. 1, the underlayer film 23, shown in FIG. 2, of non-magnetic hexagonal closed packed structure or weak ferro magnetic hexagonal closed packed structure of which the saturation magnetization is 100 emu/cc or below, the underlayer 12 formed thereunder, the underlayer shown in FIG. 3, the under layer 53, shown in FIG. 5, of non-magnetic hexagonal closed packed structure or weak ferro magnetic hexagonal closed packed structure of which the saturation magnetization is 100 emu/cc or below, and the underlayer 12 in FIG. 6 are all provided for the purpose of controlling the crystal orientation and crystal grain size of the magnetic films formed on these underlayers, respectively, thus making it possible to improve the characteristics of the magnetic films along their purposes. If the saturation magnetization of the underlayer film exceeds 100 emu/cc, the medium noise will be increased, and the recording resolution will be reduced, thus adversely affecting the magnetic recording/reproduction characteristics.

As to the cause of the reverse magnetic domain, if the perpendicular magnetization film is perpendicularly magnetized in one direction, an intense demagnetizing field is acted on the medium surface, and this action of demagnetizing field produces the so-called reverse magnetic domains in the direction opposite to the perpendicularly magnetized direction. In order to suppress this reverse magnetic domains from being produced, it is necessary to employ a perpendicular magnetization film having magnetic anisotropy energy. The magnetic anisotropy energy is desirably $2.5 \times 10^6$ erg/cc or above.

The magnetic anisotropy energy of the perpendicular magnetization film made of Co-based alloy easy to handle as practical media is $5 \times 10^6$ erg/cc. There is a Co-based alloy regular lattice material having more magnetic anisotropy energy than this value, but this material has difficulty in reducing noise because too large media noise is caused by a strong mutual action in the longitudinal direction of the magnetic film.

The multi-layered perpendicular magnetization film of Pt/Co, Pd/Co other than Co alloy or a perpendicular magnetization film of amorphous structure containing rare earth elements such as TbFeCo has magnetic-anisotropy energy of $2.5 \times 10^6$ erg/cc or above and thus can be expected to attain the present subject. However, the magnetic mutual action in the longitudinal direction will also be strong as in the above description if no countermeasure is provided, and hence the medium noise is large. Thus, a special device is needed for reducing the media noise. In addition, in order to increase the surface magnetic recording density up to 5 Gb/in$^2$ or above, the linear recording density is required to be 250 kFCI or above. The bit length corresponding to this linear recording density is 100 nm. The thickness of the magnetic recording media for recording is desired to be less than the minimum bit length. Thus, the thickness of the perpendicular magnetization film is required to be 100 nm or below.

Since the reverse magnetic domains can be suppressed by use of a perpendicular magnetization film of high magnetic anisotropy energy, the medium noise due to the reverse magnetic domains can be prevented from being produced. However, the medium noise is also produced by a microscopic magnetic instability present in the medium surfaces. If the magnetic mutual action in the longitudinal direction of the magnetic film is large, a long-period magnetizing instability is produced. In addition, it was found that if there is magnetic heterogeneity in the surface of the perpendicular magnetization film, a short-period magnetizing instability is produced, thus causing the medium noise.

From the results of the experiments by the inventors, it was found that in order to suppress these long-period, short-period magnetic instability, it is necessary that a soft magnetic film or a magnetic film having a magnetic easy axis in the longitudinal direction be formed on the surface of the perpendicular magnetization film. In this case, the thickness of the magnetic films must be selected to be smaller than that of the perpendicular magnetization film for recording. If the film thickness is large, the magnetic flux produced from the recorded bits on the perpendicular magnetization films makes closed magnetic circuits absorbed by these films, and thus the magnetic flux does not leak from the medium surfaces, so that the recorded signal cannot be reproduced by magnetic heads.

If the thickness of these magnetic films is properly thin, the long-period, short-period magnetic instability present in the perpendicular magnetization film surfaces is absorbed by the magnetic films formed on the surfaces of the perpendicular magnetization films, but the strong magnetic flux generated from the recorded bits cannot be absorbed enough. In this case, since the magnetic flux caused by the magnetic instability does not leak to the magnetic film surfaces, it cannot be detected by magnetic heads, so that the medium noise is decreased. The combination of the perpendicular magnetization film which absorbs the magnetic flux due to the magnetic instability but little absorbs the magnetic flux from the recorded bits, and the thickness of the magnetic film provided on the surface depends on the thickness of the perpendicular magnetization film, saturation magnetization, coercivity and so on. Thus, it is necessary to select the most suitable combination for each case.

The thickness of the magnetic film provided on the surface should be confined within a range of generally 2 to 10 nm or preferably 3 to 5 nm considering the factors such as controllable ability for film production and for film thickness distribution in all regions of disk surfaces. The magnetic film may be a soft magnetic film of Parmalloy, Fe—Si, Fe—Si—Al, CoNbZr or other materials or a magnetic film, of Co, Ni, Fe, CoNi, CoNiCr or the like, which is easy to be magnetized in the longitudinal direction. In addition, part of the surface of the perpendicular magnetization film may be changed to a soft magnetic film or longitudinal magnetization film by diffusing or implanting a light element such as C, B, N or P into the surface.

FIG. 7 shows an example of the application of the invention to a single-layered perpendicular magnetic recording medium.

In this single-layered perpendicular magnetic recording medium, normally the underlayer 12 for improving the perpendicular orientation of the magnetic film and controlling the crystal grain size is deposited on the non-magnetic substrate 11, and a perpendicular magnetization film 71 is formed on the underlayer. In addition, a protective film of carbon or the like is normally deposited on the magnetization film.

The magnetic film 71 is made of a Co-based alloy containing at least one of Cr, Ta, Pt, Pd, Si, V, Nb, W, Mo, Hf, Re, Zr, B, P, Ru. This magnetic film is a poly-crystal film of which the crystal grain size is normally 20 nm or below and which has the structure in which a non-magnetic element is preferentially segregated in the crystal grain boundaries in order to attain high density linear recording characteristics and low noise characteristic. This perpendicular magnetization film has a small magnetic exchange coupling force because of the presence of the segregated layer in the crystal grain boundaries, and a microscopic magnetic instability because of the compositional segregation and undulations in the media surfaces.

To reduce the medium noise, a soft magnetic film or longitudinal magnetization film 72 which is thinner than the thickness of the perpendicular magnetization film is deposited on the perpendicular magnetization film 71. The perpendicular magnetization film 71 may be a multi-layer type perpendicular magnetization film made of Co/Pt, Co/Pd, Co alloy/Pt, Co alloy/Pd, Co alloy/Pt or Pd alloy, or a amorphous type perpendicular magnetization film containing a rare earth element such as TbFeCo in place of being made of a Co-based alloy material.

When the soft magnetic film 72 is provided on the perpendicular magnetization film 71, the magnetic flux generated from the magnetic instability present in the surface of the perpendicular magnetization film 71 is absorbed by the magnetic film, and as a result the medium noise is decreased. In addition, when a thin magnetic film is formed, the magnetic instability is not easily generated even if microscopic undulations and composition segregation are present in the surface. As shown in FIG. 7, the protective film 15 is deposited on the magnetization film.

In order to achieve a recording density of 5 Gb/in$^2$ or above, the total thickness of the perpendicular magnetization film 71 and soft magnetic film 72 is required to be confined within the range of 7 nm to 100 nm. If the thickness is larger than 100 nm, the volume of magnetic crystal grain constituting the film becomes large, and as a result the magnetic switching volume is enlarged. Thus, the medium noise is increased, degrading the signal to noise ratio, so that a recording density of 5 Gb/in$^2$ or above cannot be attained. If the thickness is smaller than 7 nm, the recording magnetization is remarkably deteriorated by thermal instability.

The object can also be achieved by use of the structures shown in FIGS. 8 through 10. In the medium structure shown in FIG. 8, an underlayer 73 having a nonmagnetic hexagonal closed packed structure or a weak ferro hexagonal closed packed structure of 100 emu/cc or below is formed between the first perpendicular magnetization film 71 and the non-magnetic substrate 11, and the underlayer 12 is also formed under the underlayer 73 in order to control the crystal grain orientation of the underlayer film 73. In addition, the magnetic film 72 made of a thin soft magnetic film or longitudinal magnetization film is deposited on the perpendicular magnetization film 71. By this dual underlayer structure, it is possible to highly control the crystal grain size and crystal orientation of the perpendicular magnetization film, and hence to attain low noise characteristics.

The structures shown by the cross-sectional views of medium of FIGS. 9 and 10 are of the perpendicular magnetic recording medium of the type in which a soft-magnetic film layer is held under the perpendicular magnetization film. As shown in FIGS. 9 and 10, a soft magnetic film layer 74 is formed on the substrate. In this case, the magnetic film 72 of a soft magnetic film or having longitudinal magnetic anisotropy is also formed on the perpendicular magnetization film.

In FIGS. 7 through 10, the magnetic film formed on the perpendicular magnetization film absorbs the magnetic flux generated from the long-period, short period magnetic instability present in the surface of the perpendicular magnetization film, thus serving to reduce the medium noise. The underlayer 12 in FIG. 7, the underlayer 73 having a non-magnetic hexagonal closed packed structure or a weak ferro hexagonal closed packed structure of which the saturation magnetization is 100 emu/cc or below, and the underlayer 12 under it as shown in FIG. 8, and the underlayer 73 in FIG. 10 are all provided for the purpose of controlling the crystal orientation and crystal grain size of the magnetic film formed on the underlayers. Thus, the magnetic film can be improved in the characteristics.

In addition, the protective film 15 is formed as shown in the figures.

DESCRIPTION OF THE PREFERRED EMBODIMENTS

Embodiment 1

Figure 1:
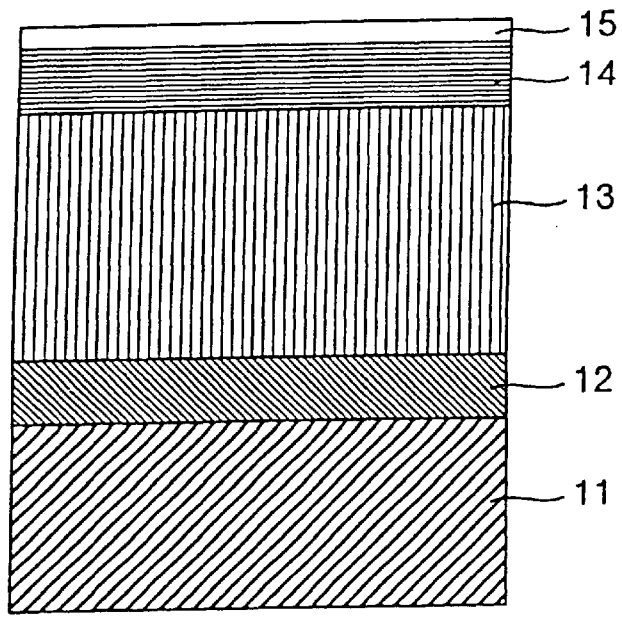
FIG. 1 is a cross-sectional view of one embodiment of a magnetic recording medium according to the invention.

The magnetic recording medium having the cross section shown in FIG. 1 was produced by depositing films on a glass substrate of 2.5-inch diameter according to DC magnetron sputtering method. On the substrate 11, there were formed in turn the underlayer 12, the first perpendicular magnetization film 13, the second perpendicular magnetization film 14, and the protective film 15. The underlayer was deposited by use of a Ti-10 at % Cr target, the first perpendicular magnetization film by a Co-19 at % Cr-8 at % Pt target, the second perpendicular magnetization film by a target of Co and Pt, and the protective film by a carbon target.

Under the conditions of a sputtering Ar gas pressure of 3 m Torr, sputter power of 10 W/cm$^2$, and substrate temperature of 250° C., a TiCr film was formed up to a thickness of 30 nm, the first perpendicular magnetization film up to 30 nm, a Co/Pt multi-layered film of the second perpendicular magnetization film up to 6 nm, and the carbon film up to 10 nm. As to the Co/Pt multilayered film of the second perpendicular magnetization film, a Co target and a Pt target were alternately operated to grow a film of 1.5 nm in each part of one cycle, and thus the total thickness, 6 nm of the second perpendicular magnetization film was grown in two cycles. Thus, the magnetic recording medium of which the cross section is shown in FIG. 1 was produced. Here, the anisotropy energy of the first perpendicular magnetization film was $3 \times 10^6$ erg/cc, and the anisotropy energy of the second perpendicular magnetization film was $2 \times 10^7$ erg/cc.

In addition, as the second perpendicular magnetization film, multi-layered films of Co/Pd, Co-16 at % Cr/Pt, and Co/Pt-20 at % Pd were grown up to the same thickness and structure as given above. The perpendicular magnetization film of TbFeCo was also formed to have the same thickness. Thus, different magnetic recording medium were produced. The anisotropy energy of the second perpendicular magnetization film for each case was $1 \times 10^7$ erg/cc for Co/Pd, $1.2 \times 10^7$ erg/cc for CoCr/Pt, $8 \times 10^6$ erg/cc for Co/PtPd, and $6 \times 10^6$ erg/cc for TbFeCo. More-over, magnetic recording medium of the same structure, but having no second perpendicular magnetization film were produced as samples for comparison.

The coercivity (Hc) and read/write characteristics of these magnetic recording medium were evaluated by a vibrating sample magnetometer (VSM) and a dual head with inductive head for writing and with magnetoresistive (MR) head for reading. The gap length of the record head was selected to be 0.2 μm, the shield gap length of the MR head for reading to be 0.2 μm, and the spacing for measurement to be 0.06 μm. The half output decoding density ($D_{50}$), which corresponds to the half of the low-frequency read output, was measured. The signal to noise ratio, S/N ratio for magnetic recording at 20 kFCI was measured relative to the S/N ratio of the samples for comparison. The measured results are shown in Table 1.

TABLE 1

|  | INVENTION | | | | | EXAMPLES FOR COMPARISON |
| --- | --- | --- | --- | --- | --- | --- |
| UNDERLAYER |  |  | Ti—Cr |  |  | Ti—Cr |
| FIRST PERPENDICULAR FILM |  |  | CoCrPt |  |  | CoCrPt |
| SECOND PERPENDICULAR FILM | Co/Pt | Co/Pd | CoCr/Pt | Co/PtPd | TbFeCo | No |
| COERCIVITY (kOe) | 3.2 | 2.7 | 2.8 | 2.6 | 2.9 | 2.5 |
| RECORDING DENSITY $D_{50}$ (kFCI) | 210 | 225 | 208 | 245 | 240 | 180 |
| S/N (RELATIVE VALUE) | 1.8 | 1.9 | 2.3 | 2.1 | 1.7 | 1 |

From the table, it was found that the magnetic recording medium of this embodiment have larger $D_{50}$ and S/N than the samples for comparison and thus can be used as high-density magnetic recording medium. In addition, a magnetic recording/reproducing apparatus with MR head for reading was produced which employs the 2.5-in diameter magnetic recording media made according to this embodiment. This apparatus was operated under the condition of 5.7 Gb/in$^2$ in areal density. The result was that the error rate can be confined within $1 \times 10^{-9}$. Thus, it was confirmed that this apparatus can be used as ultrahigh density magnetic recording/reproducing apparatus.

Embodiment 2

Figure 2:
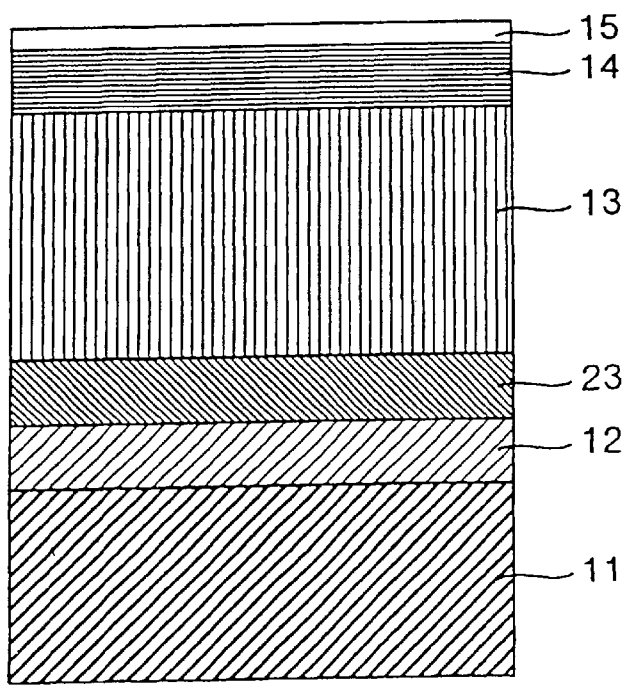
FIG. 2 is a cross-sectional view of another embodiment of a magnetic recording medium according to the invention.

The magnetic recording medium having the cross-section shown in FIG. 2 was produced by depositing films on a 2.5-in diameter silicon substrate according to the DC magnetron sputtering method. On the substrate 11, there were formed in turn the first underlayer 12, the second underlayer 23, the first perpendicular magnetization film 13, the second perpendicular magnetization film 14 and the protective film 15. The first underlayer was deposited by use of a Ti-10 at % Cr target, the second underlayer by a Co-35 at % Cr target, the first perpendicular. magnetization film by a Co-16 at % Cr-8 at % Pt-3 at % Ta target, the second perpendicular magnetization film by a target of Co and Pt, and the protective film by a carbon target.

Under the conditions of a sputtering Ar gas pressure of 3 m Torr, sputter power of 10 W/cm$^2$, and substrate temperature of 280° C., a CrTi film was formed up to a thickness of 30 nm, a CoCr film up to 15 nm, the first perpendicular magnetization film up to 25 nm, a Co/Pt multi-layered film of the second perpendicular magnetization film up to 6 nm, and the carbon film up to 10 nm. As to the Co/Pt multi-layered film of the second perpendicular magnetization film, a Co target and a Pt target were alternately operated to grow a film of 1.5 nm in each part of one cycle, and thus the total thickness, 6 nm of the second perpendicular magnetization film was grown in two cycles. Thus, the magnetic recording medium of which the cross-section is shown in FIG. 2 was produced. The saturation magnetization of the Co-Cr film formed as the second underlayer was 25 emu/cc, and the anisotropy energy of the second perpendicular magnetization film 14 was $2 \times 10^7$ erg/cc.

Magnetic recording media of the same structure but having no second perpendicular magnetization film were produced as samples for comparison.

The coercivity (Hc) and read/write characteristics of these magnetic recording media were evaluated by a vibrating sample magnetometer (VSM) and a dual head with inductive head for writing and with magnetoresistive (MR) head for reading. The gap length of the record head was selected to be 0.2 μm, the shield gap length of the giant magnetoresistive (GMR) head for reading to be 0.15 μm, and the spacing for measurement to be 0.04 μm. The half output recording density ($D_{50}$) was measure. The signal to noise ratio, S/N ratio for magnetic recording at 20 kFCI was measured relative to the S/N ratio of the samples for comparison. The measured results are shown in Table 2.

TABLE 2

|  | INVENTION | EXAMPLES FOR COMPARISON |
| --- | --- | --- |
| FIRST UNDERLAYER | Ti—Cr | Ti—Cr |
| SECOND UNDERLAYER | CoCr | CoCr |
| FIRST PERPENDICULAR FILM | CoCrPtTa | CoCrPtTa |
| SECOND PERPENDICULAR FILM | Co/Pt | No |
| COERCIVITY He (kOe) | 3.5 | 2.6 |
| RECORDING DENSITY $D_{50}$ (kFCI) | 260 | 190 |
| S/N (RELATIVE VALUE) | 2.3 | 1 |

From the table, it was found that the magnetic recording medium of this embodiment have much larger $D_{50}$ and S/N than the samples for comparison and thus can be used as high-density magnetic recording media. In addition, a magnetic recording/reproducing apparatus with GMR head for reading was produced which employs the 2.5-in diameter magnetic recording medium made according to this embodiment. This apparatus was operated under the condition of 8 Gb/in$^2$ in areal density. The result was that the error rate can be confined within $1 \times 10^{-9}$. Thus, it was confirmed that this apparatus can be used as ultra-high density magnetic recording/reproducing apparatus.

Embodiment 3

Figure 3:
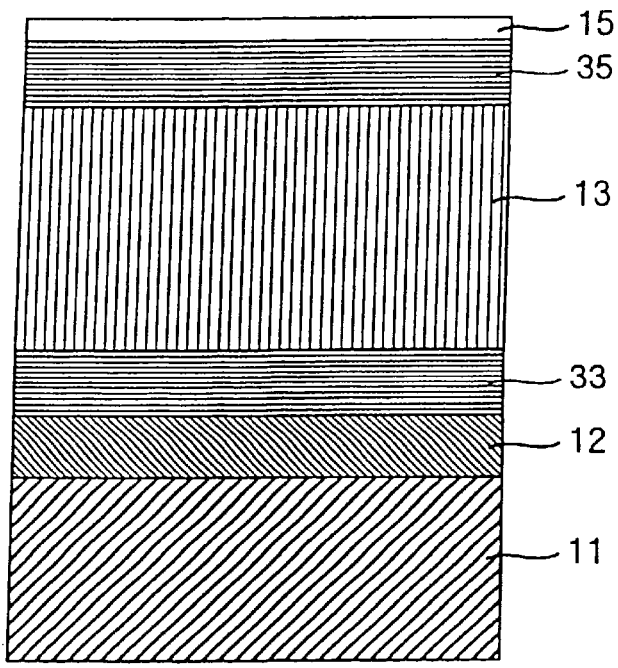
FIG. 3 is a cross-sectional view of another embodiment of a magnetic recording medium according to the invention.

A perpendicular magnetization film of Co/Pt multi-layered film 6 nm thick was provided in place of the second underlayer in the magnetic recording media of embodiment 2. The other portions were made the same as above. The produced magnetic recording medium have the cross-sectional structure shown in FIG. 3. In other words, on the 2.5-in diameter substrate 11, there were formed in turn the underlayer 12 of CrTi film 30 nm thick, the perpendicular magnetization film 33 of Co/Pt multi-layered film 6 nm thick, the first perpendicular magnetization film 13 of CoCrPtTa film 25 nm thick, the second perpendicular magnetization film 35 of Co/Pt multi-layered film 6 nm thick, and the protective film 15 of carbon film 10 nm thick.

Magnetic recording media with no second perpendicular magnetization film of Co/Pt multi-layered film under the protective film 15 were also produced as samples for comparison.

As a result of comparing the measurements under the same read/write conditions as in Embodiment 2, it was confirmed that the magnetic recording media according to the invention have excellent $D_{50}$ and S/N which are 20%, 75% higher than the samples for comparison.

Embodiment 4

Figure 4:
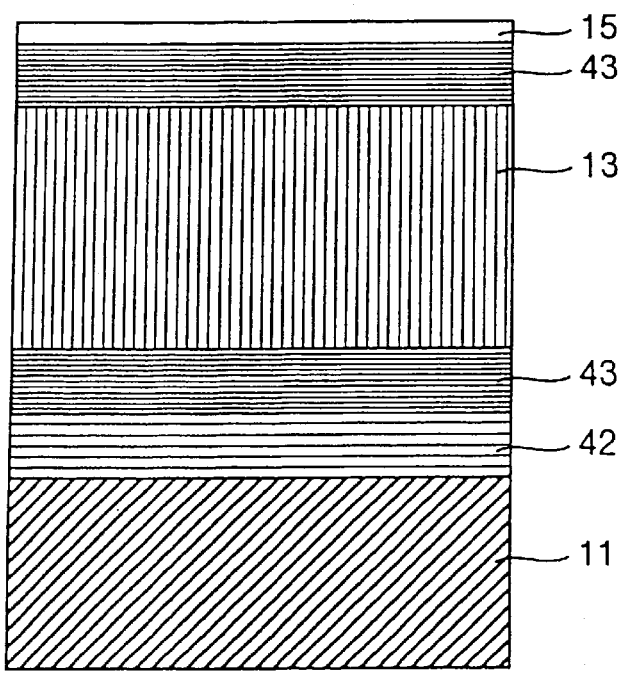
FIG. 4 is a cross-sectional view-of another embodiment of a magnetic recording medium according to the invention.

The magnetic recording medium having the cross-section shown in FIG. 4 was produced by depositing on a glass substrate of 2.5-inch diameter according to DC magnetron sputtering method. On the substrate 11, there were formed in turn the soft magnetic layer 42, the multi-layered perpendicular magnetization film 43, the first perpendicular magnetization Co-alloy film 13, the second perpendicular magnetization multi-layered film 44 and the protective film 15. The soft magnetic layer was deposited by use of a Fe-80 at % Ni target, the multilayered perpendicular magnetization film by a target of Co and Pt, the first perpendicular magnetization film of Co alloy by a Co-19 at % Cr-8 at % Pt target, the multilayered second perpendicular magnetization film by Co, Pt target and the protective film by a carbon target.

Under the conditions of a sputtering Ar gas pressure of 3 m Torr, sputter power of 10 W/cm$^2$, and substrate temperature of 250° C., a FeNi film was formed up to a thickness of 30 nm, a Co/Pt multi-layered film of perpendicular magnetization film up to 6 nm, a CoCrPt perpendicular magnetization film up to 30 nm, a Co/Pt multi-layered perpendicular magnetization film up to 6 nm, and the carbon film up to 10 nm. As to the Co/Pt multi-layered perpendicular magnetization film, a Co target and a Pt target were alternately operated to grow a film of 1.5 nm in each part of one cycle, and thus the total thickness, 6 nm of the perpendicular magnetization film was grown in two cycles. The anisotropy energy of the Co/Pt multi-layered perpendicular magnetization film was 2×10$^7$ erg/cc.

Magnetic recording media with no perpendicular magnetization film of Co/Pt multi-layered film on the medium were also produced as samples for comparison.

As a result of comparing the measurements under the same read/write conditions as in Embodiment 3, it was confirmed that the magnetic recording medium according to this embodiment have excellent $D_{50}$ and S/N which are 40%, 85% higher than the samples for comparison and thus can be used as high-density magnetic recording medium. In addition, a 2.5-in disk type magnetic recording/reproducing apparatus was produced which has a high-sensitive read head (see The Institute of Electronics and Communication Engineers of Japan, Technical Journal vol. 96, No. 486, pp. 29 to 35) that makes use of magnetic tunnel phenomenon and which employs the magnetic recording media produced according to this embodiment. After the measurement, it was confirmed that under the condition of area density of 20 Gb/in$^2$, the apparatus can attain an error rate of 1×10$^{-9}$ or below and thus can be used as ultra-high density recording/reproducing apparatus.

Embodiment 5

Figure 5:
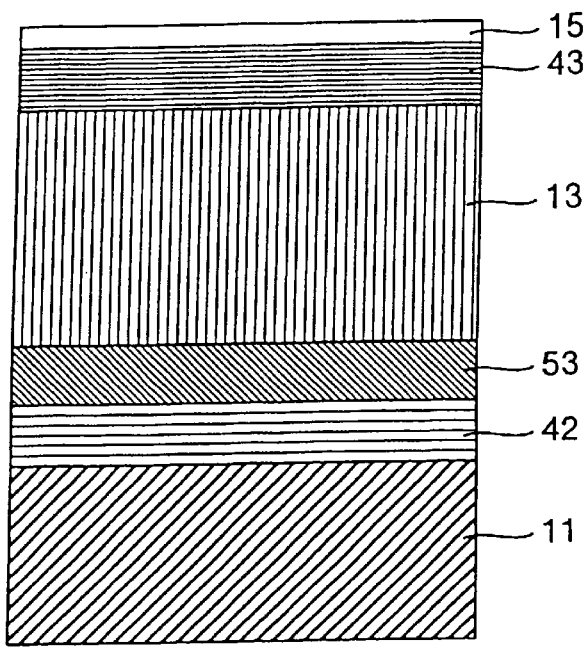
FIG. 5 is a cross-sectional view of another embodiment of a magnetic recording medium according to the invention.

A Co-35 at % Cr film 20 nm thick was provided on the soft magnetic layer in the magnetic recording medium of embodiment 4. The other portions were made the same as above. The produced magnetic recording media have the cross-sectional structure shown in FIG. 5. In other words, on the 2.5-in diameter substrate 11, there were formed in turn the soft magnetic layer 42 of Fe—Ni film 30 nm thick, the underlayer 53 of Co—Cr film 20 nm thick, the first perpendicular magnetization film 13 of Co-19 at % Cr-8 at % Pt 30 nm thick, the second perpendicular magnetization film 43 of Co/Pt multi-layered film 6 nm thick, and the protective film 15 of carbon film 10 nm thick.

Magnetic recording medium with no perpendicular magnetization film of Co/Pt multi-layered film under the protective film were also produced as samples for comparison.

As a result of comparing the measurements under the same read/write conditions as in Embodiment 4, it was confirmed that the magnetic recording medium according to this embodiment have excellent $D_{50}$, and S/N which are 32%, 60% higher than the samples for comparison.

Embodiment 6

Figure 6:
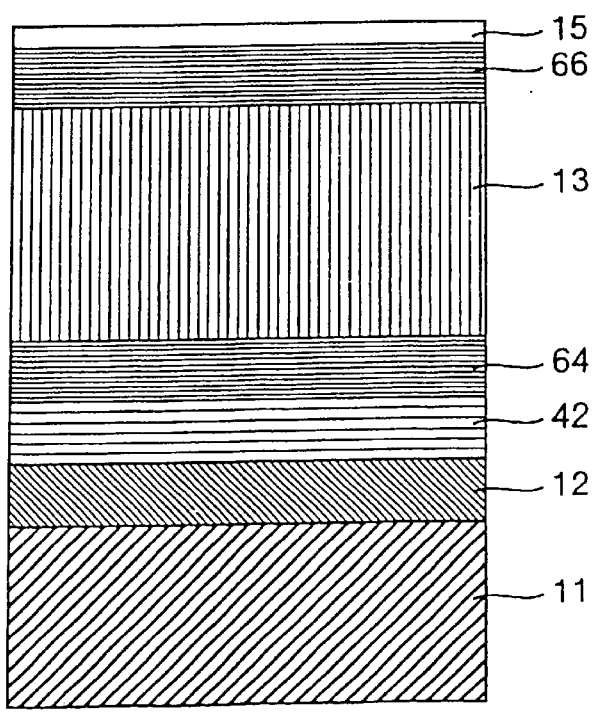
FIG. 6 is a cross-sectional view of another embodiment of a magnetic recording medium according to the invention.

A Co/Pt multi-layered perpendicular magnetization film 6 nm thick and a Ti film 20 nm thick were provided on and under the soft magnetic layer in the magnetic recording medium of embodiment 4. The other portions were made the same as above. The produced magnetic recording media have the cross-sectional structure shown in FIG. 6. In other words, on the 2.5-in diameter substrate 11, there were formed in turn the underlayer 12 of Ti film 20 nm thick, the soft magnetic layer 42 of Fe—Ni film 30 nm thick, the Co-Pt multi-layered perpendicular magnetization film 64 6 nm thick, the first perpendicular magnetization film 13 of Co-19 at % Cr-8 at % Pt 30 nm thick, the second perpendicular magnetization film 66 of Co/Pt multi-layered film 6 nm thick, and the protective film 15 of carbon film 10 nm thick.

Magnetic recording medium with no perpendicular magnetization film of Co/Pt multi-layered film under the protective film were also produced as samples for comparison. As a result of comparing the measurements under the same read/write conditions as in Embodiment 4, it was confirmed that the magnetic recording medium according to this embodiment have excellent $D_{50}$ and S/N which are 52%, 120% higher than the samples for comparison.

Embodiment 7

Figure 7:
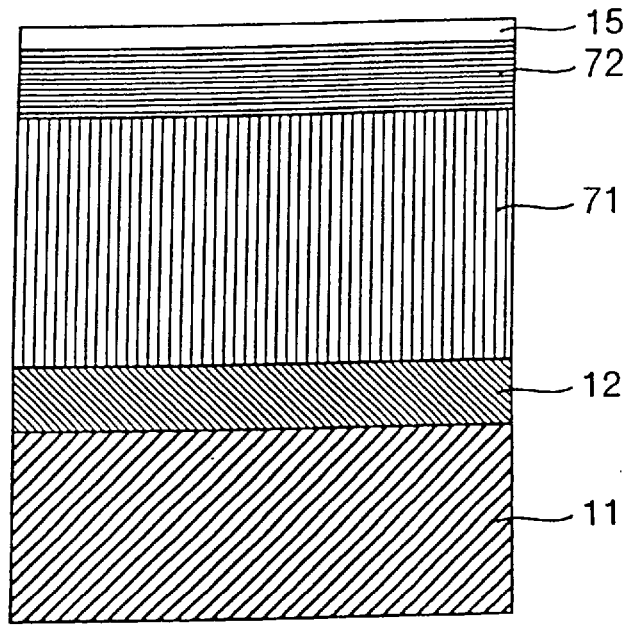
FIG. 7 is a cross-sectional view of another embodiment of a magnetic recording medium according to the invention.

The magnetic recording media having the cross-sectional structure shown in FIG. 7 were produced by depositing films on the 2.5-in diameter glass substrates according to DC magnetron sputtering method. On the 2.5 in diameter substrate 11, there were formed in turn the underlayer 12, the perpendicular magnetization film 71, the soft magnetic layer 72, and the protective film 15. The underlayer was grown by use of a Ti-10 at % 5 Cr target, the perpendicular magnetization film by a Co-19 at % Cr-8 at % Pt target, the soft magnetic film by a CoNbZr target, and the protective film by a carbon target. Under the conditions of a sputtering Ar gas pressure of 3 m Torr, sputter power of 10 W/cm$^2$, and substrate temperature of 250° C., the CrTi film was deposited up to a thickness of 30 nm, the first perpendicular magnetization film up to 30 nm, the soft magnetic film of CoNbZr up to 4 nm, and the carbon film up to 10 nm.

In addition, perpendicular magnetic recording medium with materials Fe—Ni, Fe—Si and Fe—Si—Al used for soft magnetic film 72 were produced. Also, other perpendicular magnetic recording medium were produced which have films of Co, Ni—Cr having longitudinal magnetic anisotropy deposited up to a thickness of 4 nm in place of the soft magnetic film 72.

Perpendicular magnetic recording medium with the carbon protective film 15 directly formed on the perpendicular magnetization film 71 were produced as samples for comparison.

The write/read characteristics of these magnetic recording medium were measured by the dual head. The gap length of the write head was selected to be 0.2 mm, the shield gap length of the magnetoresistive (MR) head for reading to be 0.2 mm, and the spacing for measurement to be 0.06 mm. The half-output recording density (D5o) was measured. The noise in the magnetic recording at 20 KFCI was measured relative to the noise of the samples for comparison. The measured results are shown in Table 3.

TABLE 3

|  | EXAMPLES FOR COMPARISON | EMBODIMENT 1 | | | | | |
| --- | --- | --- | --- | --- | --- | --- | --- |
| UNDERLAYER | TiCr | TiCr | TiCr | TiCr | TiCr | TiCr | TiCr |
| PERPENDICULAR MAGNETIZATION FILM | CoCrPt | CoCrPt | CoCrPt | CoCrPt | CoCrPt | CoCrPt | CoCrPt |
| MAGNETIC FILM | No | CoNbZr | Fe—Ni | Fe—Si | Fe—Si—Al | Co | Ni—Cr |
| RECORDING DENSITY $D_{50}$ (kFCI) | 155 | 245 | 220 | 210 | 235 | 240 | 225 |
| NOISE (RELATIVE VALUE) | 1 | 0.45 | 0.52 | 0.38 | 0.44 | 0.50 | 0.37 |

From the results, it was found that the magnetic recording media according to this embodiment have much larger $D_{50}$ and lower medium noise than the samples for comparison, and thus can be used as high density magnetic recording medium. A 2.5-in disk type magnetic recording/reproducing apparatus was produced by use of the magnetic recording medium produced according to this embodiment and the MR head for reading. It was confirmed that it assures an error rate of $1 \times 10^{-9}$ at a recording density of 6 Gb/in$^2$, and thus can be used as an ultra-high density recording/reproducing apparatus.

Embodiment 8

Figure 8:
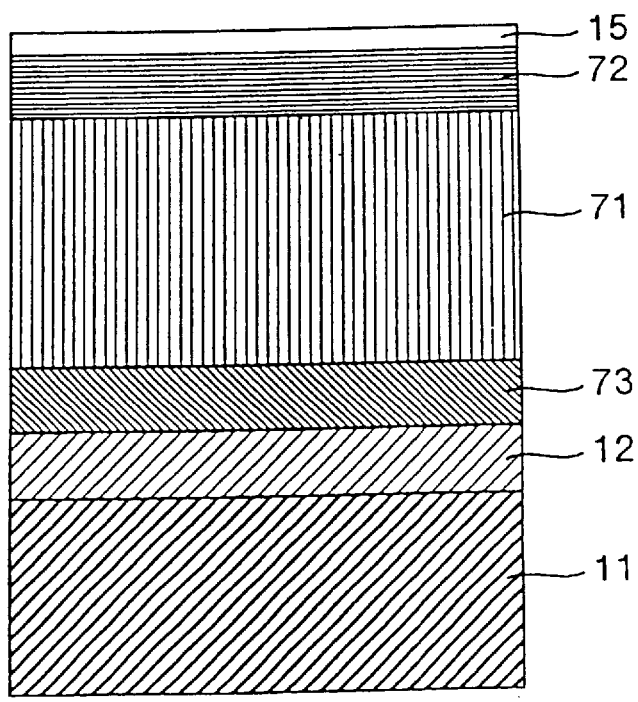
FIG. 8 is a cross-sectional view of another embodiment of a magnetic recording medium according to the invention.

The magnetic recording medium having the cross-sectional structure shown in FIG. 8 were produced by depositing films on the 2.5-in diameter glass substrates according to DC magnetron sputtering method. On the 2.5 in diameter substrate 11, there were formed in turn the first underlayer 12, the second underlayer 73, the perpendicular magnetization film 71, the magnetic film 72, and the protective film 15. The first underlayer was grown by use of a Ti-10 at % Cr target, the second underlayer by a Co-35 at % Cr target, the perpendicular magnetization film by a Co-16 at % Cr-8 at % Pt-3 at % Ta target,.the magnetic film by a Fe-80 at % Ni target, and the protective film by a carbon target. The saturation magnetization of the Co-35 at % Cr is 20 emu/cc or below, and thus the second underlayer is a weak ferro magnetic film. Under the conditions of a sputtering Ar gas pressure of 3 m Torr, sputter power of 10 W/cm$^2$, and substrate temperature of 280° C., the CrTi film was deposited up to a thickness of 30 nm, the CoCr film up to 15 nm, the perpendicular magnetization film up to 25 nm, the soft magnetic film of FeNi up to 3 nm, and the carbon film up to 10 nm. The produced perpendicular magnetic recording media have the cross-sectional structure shown in FIG. 8.

Perpendicular magnetic recording medium with the carbon protective film 15 directly formed on the perpendicular magnetization film 71 were produced as samples for comparison.

The coercivity (Hc) and write/read characteristics of these magnetic recording media were evaluated by the vibrating sample magnetometer (VSM) and the dual head, respectively. The gap length of the write head was selected to be 0.2 mm, the shield gap length of the giant magnetoresistive (GMR) head for reading to be 0.15 mm, and the spacing for measurement to be 0.04 mm. The half output recording density ($D_{50}$) was measured. The signal to noise ratio, S/N ratio in the magnetic recording at 20 KFCI was measured relative to the S/N ratio of the samples for comparison. The measured results are shown in Table 4.

TABLE 4

|  | EXAMPLES FOR COMPARISON | EMBODIMENT 2 |
| --- | --- | --- |
| FIRST UNDERLAYER | Ti—Cr | Ti—Cr |
| SECOND UNDERLAYER | CoCr | CoCr |
| PERPENDICULAR MAGNETIZATION FILM | CoCrPtTa | CoCrPtTa |
| MAGNETIC FILM | No | FeNi |
| COERCIVITY He (kOe) | 2.5 | 3.1 |
| RECORDING DENSITY D50 (kFCI) | 185 | 255 |
| S/N (RELATIVE VALUE) | 1 | 2.3 |

From the results, it was found that the perpendicular magnetic recording media according to this embodiment have much higher $D_{50}$ and S/N than the samples for comparison, and thus can be used as high-density magnetic recording medium. In addition, a 2.5-inch disk type magnetic recording/reproducing apparatus was produced which employs the magnetic recording media made according to this embodiment and the GMR head for reading. It was confirmed that this apparatus can attain an error rate of $1 \times 10^{-9}$ at a longitudinal recording density of 8 Gb/in$^2$ and thus can be used as ultra-high. density recording/reproducing apparatus.

Embodiment 9

Figure 9:
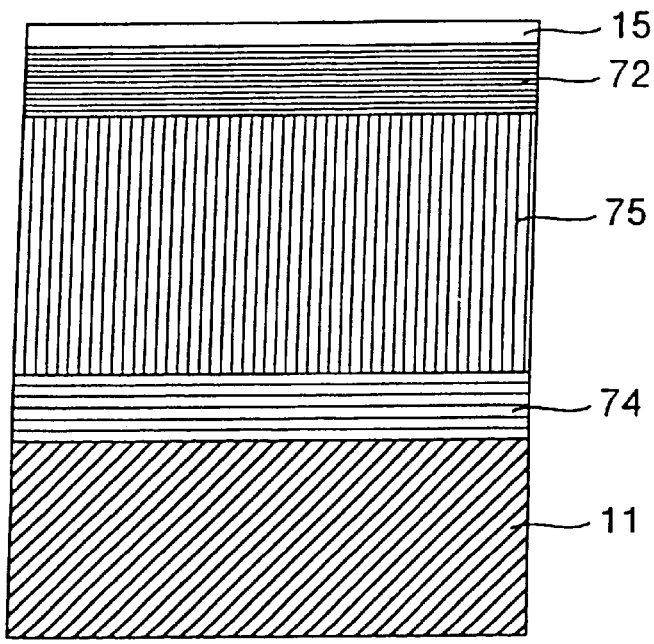
FIG. 9 is a cross-sectional view of another embodiment of a magnetic recording medium according to the invention.

The magnetic recording media having the cross-sectional structure shown in FIG. 9 were produced by depositing films on the 2.5-in diameter glass substrates according to DC magnetron sputtering method. On the 2.5 in diameter substrate 11, there were formed in turn the soft magnetic layer 74, the multi-layered perpendicular magnetization film 75, the magnetic film 72 of CoB alloy, and the protective film 15. The soft magnetic layer was grown by use of a Fe-80 at % Ni target, the multi-layered perpendicular magnetization film by a target of Co and Pt, the magnetic film of CoB alloy by a Co-6 at % B target, and the protective film by a carbon target. Under the conditions of a sputtering Ar gas pressure of 3 m Torr, sputter power of 10 W/cm$^2$, and substrate temperature of 250° C., the FeNi film was deposited up to a thickness of 30 nm, the perpendicular magnetization film of Co/Pt multi-layered film up to 30 nm, the CoB magnetic film up to 3 nm, and the carbon film up to 10 nm. Here, as to the Co/Pt multi-layered film as the perpendicular magnetization film 75, the Co and Pt targets were alternately operated to grow a film of 1.5-nm thickness in each part of one cycle, and the perpendicular magnetization film having the total thickness of 30 nm was grown in 10 cycles.

Perpendicular magnetic recording medium with the carbon protective film 15 directly formed on the perpendicular magnetization film 75 were produced as samples for comparison.

As a result of comparing the write/read characteristics of these magnetic recording medium in the same way as in Embodiment 8, it was found that the magnetic recording medium according to this embodiment have much higher $D_{50}$ and S/N than the samples for comparison, and thus can be used as high-density magnetic recording media. In addition, a 2.5-in disk type magnetic recording/reproducing apparatus was produced which has a high-sensitive read head that makes use of magnetic tunnel phenomenon and which employs the magnetic recording media produced according to this embodiment. After the measurement, it was confirmed that under the condition of area density of 20 $Gb/in^2$, the apparatus can attain an error rate of $1 \times 10^{-9}$ and thus can be used as ultra-high density recording/reproducing apparatus.

Embodiment 10

Figure 10:
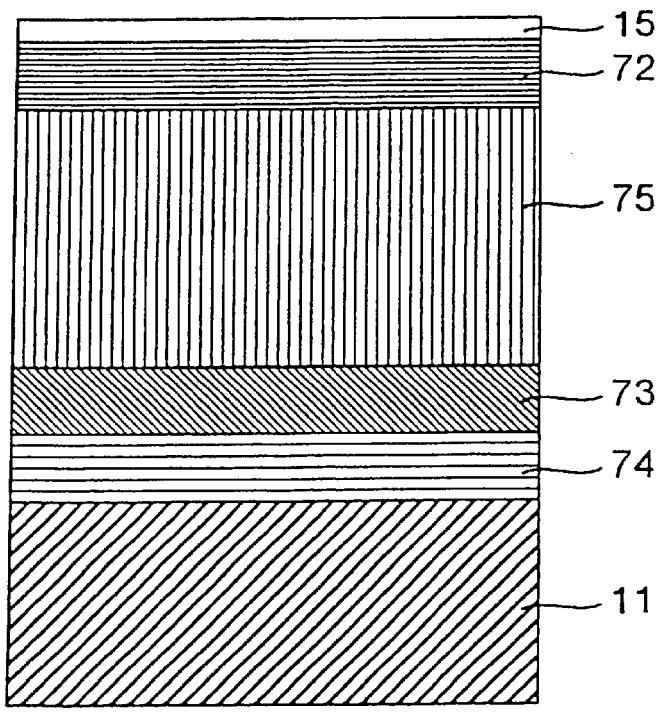
FIG. 10 is a cross-sectional view of another embodiment of a magnetic recording medium according to the invention.

The Co 35 at % Cr film 73 of 20-nm thickness was provided on the soft magnetic layer 74 in the perpendicular magnetic recording medium according to Embodiment 9. The other portions were the same as above. The produced perpendicular magnetic recording media have the cross-sectional structure shown in FIG. 10. Perpendicular magnetic recording medium with the carbon protective film 15 directly formed on the perpendicular magnetization film 75 were produced as samples for comparison. As a result of comparing the characteristics under the same write/read conditions as in Embodiment 9, it was confirmed that the perpendicular magnetic recording medium of the invention have respectively $D^{50}$, S/N25%, 55% improved higher than the samples for comparison.

Embodiment 11

The present invention will be further described in detail with reference to FIGS. 11A to 11F.

In FIGS. 11A to 11F, there is shown a. substrate 101 which was an Si disk with a thermally oxidized Si film formed on the surface. The substrate may be a glass substrate, NiP coated Al substrate, carbon substrate or high molecular substrate except the Si substrate. The rinsed substrates 101 were placed in a sputtering apparatus, and the apparatus was evacuated up to 1×10-8 Torr. Then, the substrates 101 were heated at 230° C. to form an underlayer 102 for controlling the crystal grain size and magnetic anisotropy of the magnetic films. Any type of the underlayer 102 can be selected depending on the kinds of the magnetic film to be formed on this underlayer. The magnetic film can be made of a material of the hexagonal closed packed structure, body-centered cubic structure, face-centered cubic or rhombic structure. If the magnetic film is made of a material of hcp (hexagonal closed packed) structure chiefly containing Co, it is possible to most generally select for the underlayer a material chiefly containing an element of Ti, Ta, Ru, Hf, Co of hcp structure with Cr, V or W added or an amorphous-like material of Si, Ge or others. Also, the underlayer 102 may be a single-layered structure of a single material or two or more-layered structure of different materials. In this embodiment, a Ti-10 at % Cr alloy film of hcp structure for the first underlayer was deposited on the substrate 101 up to a thickness of 30 nm, and a non-magnetic alloy film of Co-35 at % Cr alloy 20 nm thick was formed on the first underlayer, thus completing the two-layered underlayer 102. The underlayer 102 has the hcp structure, and its growth orientation <002> was perpendicular to the substrate surface.

Figure 11A:
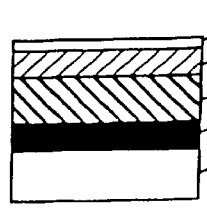
FIG. 11A to FIG. 11F are diagrams to which reference is made in explaining a magnetic recording medium of the invention.

Then, the magnetic film for recording and protective film were successively grown on the underlayer in vacuum. For the medium A of this embodiment according to the invention, as shown in FIG. 11A, a first magnetic thin film 103 of a well magnetically isolated material was deposited on the underlayer 102, and on this film was formed a second magnetic film 105 of which the perpendicular anisotropy constant Ku in the direction perpendicular to the film surface was larger than the first magnetic layer. The magnetic films may be made of a material containing chiefly Co, and additionally at least one of the elements, Cr, Fe, Mo, V, Ta, Pt, Si, B, Lr, W, Hf, Nb, Ru, Ni and rare earth elements. The first magnetic films 103 and 105 may have the same or different crystal structures of thin films. The first magnetic film 103 in the medium A may be made of a material additionally containing a large amount of non-magnetic elements of Cr, Mo, V, Ta, Pt, Si, B, Ir, W, Hf, Nb, Ru, as, for example, Co-17 at % Cr-3 at % Ta alloy or Co-15 at % Cr-10 at % Pt-3 at % Ta alloy. The first magnetic film is able to allow the non-magnetic layer or weak ferro magnetic layer locally segregated within the grain boundaries or grains of the magnetic crystal grains by the addition of non-magnetic Cr or Ta. By analyzing the composition on electron microscope, it was confirmed that the magnetic grains have the effect to improve the magnetic isolation of magnetic grains. In addition, the magnetic anisotropy of the magnetic film can be improved by adding Pt. The second magnetic film 105 in the medium A may be, for example, Co-50 at % Pt alloy, Co-20 at % Pt-5 at % Cr alloy, or Co-18 at % Pt-10 at % Cr alloy. The second magnetic film 105 is inferior to the first magnetic film 103 in the magnetic isolation because it has less local segregation structure of magnetic layer as compared with the fist magnetic film, but has a larger magnetic anisotropy constant. The magnetic anisotropy constant Kua of the first magnetic film 103 of medium A in the direction perpendicular to the film surface was in the range from $1 \times 10^6$ erg/cc to $4 \times 10^6$ erg/cc, while the magnetic anisotropy constant Kub of the second magnetic film was in the range from $5 \times 10^6$ erg/cc to $1 \times 10^7$ erg/cc. If a material having a larger Ku (more than $1 \times 10^7$ erg/cc), for example, Pt/Co multi-layered perpendicular magnetic film or Pd/Co multi-layered perpendicular magnetic film is used as the second magnetic film, the effect of the invention can be further improved. The thickness (t1) of the first magnetic film 103 and that (t2) of the second magnetic film 105 in the medium A according to this embodiment were t1=30 nm, and t2=20 nm, respectively. If these magnetic film thicknesses satisfy t1>t2, another combination of thicknesses may be used. On the second magnetic film was deposited a carbon (c) film 5 nm thick as the protective film 106.

Figure 11B:
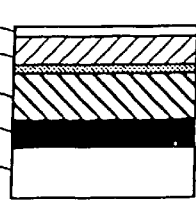

A medium B of another embodiment according to the invention can be constructed as illustrated in FIG. 11B by depositing on the underlayer 102 the first magnetic film 103 of a material of which the magnetic isolation is excellent, a non-magnetic intermediate layer 104, the second magnetic layer 105 of which the perpendicular magnetic anisotropy constant Ku in the direction perpendicular to the film surface is large, and then the protective film 106. The materials and thicknesses of the first and second magnetic films can be similarly selected as in the medium A. The non-magnetic intermediate layer 104 in the medium B has the effect of promoting the epitaxial growth of the second magnetic film 105, the effect of suppressing the crystal grains of the second magnetic film from being enlarged, and the effect of controlling the intensity of the magnetic mutual action between the first and second magnetic films. The non-magnetic intermediate layer 104 may be made of the same non-magnetic material as the underlayer 102, and should be desirably deposited to have a thickness ranging from one atom layer to 10 nm inclusive. It was 5 nm in this embodiment.

Figure 11C:
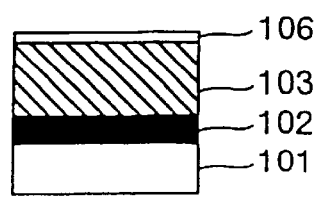
Figure 11D:
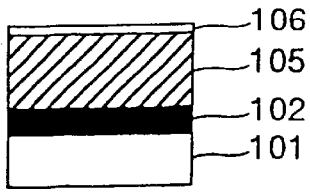
Figure 11E:
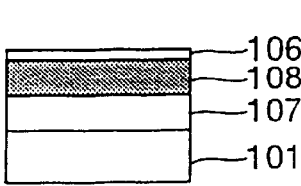
Figure 11F:
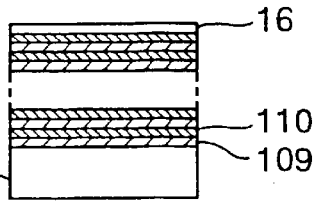

Samples of five different media for comparison were produced as shown in FIGS. 11C through 11F. The medium A for comparison, as shown in FIG. 11C, was constructed by depositing on the substrate 101 the underlayer 102, the magnetic film 103 of a single material 50 nm thick, and the protective layer 105. Here, the magnetic film was made of the same material as the first magnetic film in medium A. The medium B for comparison, as shown in FIG. 11D, was constructed by depositing on the substrate 101 the underlayer 102, the magnetic film 105 of a single matrial 50 nm thick, and the protective layer 106. Here, the magnetic film was made of the same high Ku material as the second magnetic film in medium A. The medium C for comparison, as shown in FIG. 11E, was constructed by depositing on the substrate 101 a lower magnetic film 107, an upper magnetic layer 108 and then the protective film 106. Here, the lower magnetic film 107 was made of a material having a low coercivity (Hc) in the direction perpendicular to the film surface, for example, 1000 Oe (oersted) or below, or of a material of CoNiReP or NiP in this embodiment. The upper magnetic film 108 was made of a material having a larger coercivity (1000 to 1500 Oe) in the direction .perpendicular to the film surface, for example, CoNiReP, than the lower magnetic film 107. Here, the coercivity of the thin film was changed by changing the composition of the material. The medium D for comparison, as shown in FIG. 11F, was constructed by alternately depositing non-magnetic materials 109 and 110 on the substrate over 50 cycles in a stacked manner. The non-magnetic material 109 was Pd and deposited 0.4 mn thick as a layer, and the non-magnetic material 110 was Co-15 at % Cr-3 at % Ta alloy and deposited 0.2 nm thick as a layer. The magnetic anisotropy constant Ku of this medium in the direction perpendicular to the film surface was about $8\times10^6$ erg/cc. The medium E for comparison, as shown in FIG. 11F same as in the medium D for comparison, was constructed by alternately depositing the non-magnetic materials 109, 110 on the substrate over 20 cycles in a stacked manner. The non-magnetic material 109 was Pt and was deposited 1.2 nm thick as a layer, and the magnetic material 110 was Co and deposited 0.4 nm thick as a layer. The magnetic anisotropy constant Ku of the medium in the direction perpendicular to the film surface was about $2\times10^7$ erg/cc.

Table 5 shows the characteristics of the media of the embodiment of the invention.

TABLE 5

| | | | COERCIVITY | Ku (erg/cc) | HALF-OUTPUT RECORDING DENSITY $D_{50}$ | NOISE $N/S_o$ AT 250 kFCI |
|---|---|---|---|---|---|---|
| INVENTION | MEDIUM A | | SECOND MAGNETIC FILM 1800–2100 FIRST MAGNETIC FILM 1500–2200 | SECOND MAGNETIC FILM $5 \times 10^6 - 1 \times 10^7$ FIRST MAGNETIC FILM $1 \times 10^6 - 4 \times 10^6$ | 290 kFCI | ($\mu$Vrms/$\mu$Vpp) 0.008 |
| | MEDIUM B | | SECOND MAGNETIC FILM 1800–2100 FIRST MAGNETIC FILM 1500–2200 | SECOND MAGNETIC FILM $5 \times 10^6 - 1 \times 10^7$ FIRST MAGNETIC FILM $1 \times 10^6 - 4 \times 10^6$ | 295 kFCI | 0.008 |
| MEDIA FOR COMPARISON | | A | 1500–2200 | $1 \times 10^6 - 4 \times 10^6$ | 220 kFCI | 0.015 |
| | | B | 1800–2100 | $5 \times 10^6 - 1 \times 10^7$ | 160 kFCI | 0.07 |
| | | C | LOWER MAGNETIC FILM <1000 UPPER MAGNETIC FILM 1000–1500 | $1 \times 10^6$ | 125 kFCI | 0.1 |
| | | D | 2200 | $8 \times 10^6$ | 230 kFCI | 0.012 |
| | | E | 2000 | $2 \times 10^7$ | 175 kFCI | 0.05 |

The values on Table 5 were obtained by using a ring-type inductive magnetic head (2 $\mu$m in track width, 0.2 $\mu$m in gap length) for writing, and a magnetoresistive head (MR head) for reading and by setting the magnetic spacing (the distance between the surface of the magnetic film of the medium and the magnetic pole of the magnetic head) to be 30 nm at the writing/reading process. In addition, on Table 5, the half-output recording density $D_{50}$ indicates the linear recording density corresponding to half the reproduced signal output at the low linear recording density (5 kFCI), and its unit was represented by FCI (Flux Change per Inch). Also, the noise N/So is the normalized noise, which noise measured at linear recording density 250 kFCI was normalized by the reproduced signal output at low linear recording density (5 KFCI). From Table 5, it will be seen that the media A and B of the invention have an ability of high half output recording density ($D_{50}$) and low noise characteristic as compared with the conventional media for comparison, and thus can be satisfactorily used as media for ultra-high density magnetic recording.

The magnetized states of the magnetically recorded samples were observed by a magnetic force microscope (MFM) in order to compare the causes of the low noise characteristics of media. FIGS. 12A to 12F show the results.

Figure 12A:
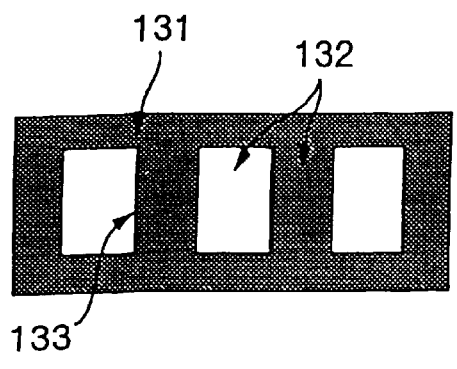
FIG. 12A to FIG. 12F are diagrams for comparing a magnetic recording medium of the invention and conventional media.
Figure 12B:
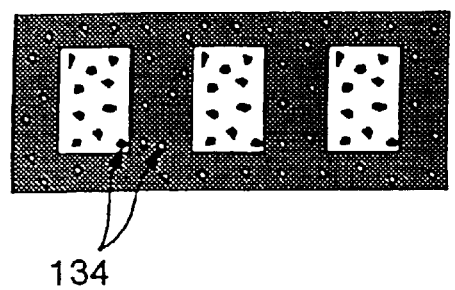
Figure 12C:
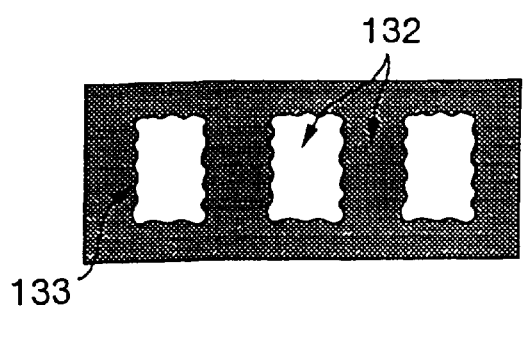
Figure 12D:
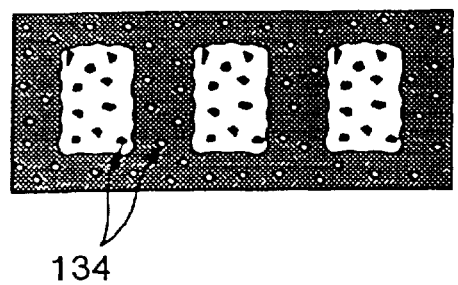
Figure 12E:
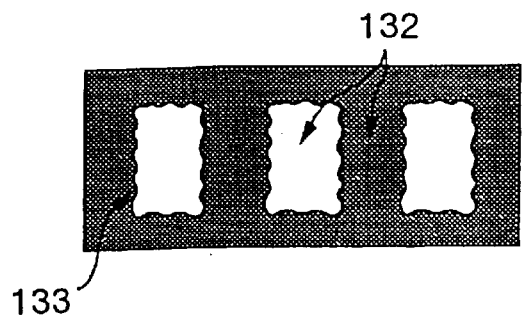
Figure 12F:
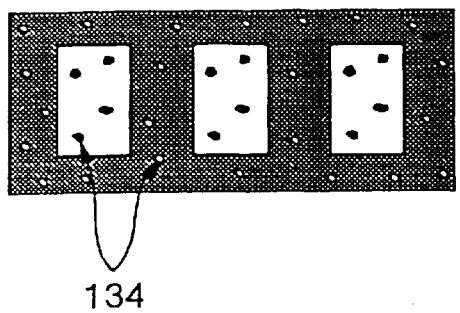

FIG. 12A shows one example of the magnetized state of media A, B illustrated in FIGS. 11A and B. The perpendicular magnetic recording was made by the ring-type inductive magnetic head after all the media surfaces were erased by DC. As illustrated, a recorded magnetic domain 132 was recorded on a DC erased region 131. The bright and dark regions respectively indicate different average orientations of magnetization. As illustrated, clear recorded magnetic domains 132 were formed in the media A, B of the invention, and the magnetization transitions 133 had small instability of which the amplitude was as fine as about 30 nm that is substantially equivalent to the average diameter of the magnetic grains of the media. FIG. 12B shows the magnetized state of medium A for comparison. In this case, by improving the crystal orientation of magnetic thin films, the fine granulation of magnetic material and the magnetic isolation of magnetic grains, it is possible to form clear magnetic domains with small magnetic transition instability as illustrated in FIG. 12B. However, a large number of magnetization irregularities 134 having more than twice the magnetic crystal grain size appear within the Dc erased region 131 and recorded domains 132 as illustrated. The magnetization irregularities 134 are called reverse magnetic domains that are formed in the direction opposite to the magnetizing orientation chiefly by the effect of demagnetizing field. These magnetization irregularities 134 cause media noise at the writing/reading process, and interfere with high-density recording. FIG. 12C shows the magnetized state of the medium B for comparison. In this case, the magnetic anisotropy constant of magnetic films was set to be large, and the mutual action between the magnetic grains is strong. Thus, a very small number of magnetization irregularities occur, but the magnetization transition instability is very great as illustrated. This makes the medium noise increase, and causes a barrier against the improvement in the recording density. FIG. 12D shows the magnetized state of medium C for comparison. In this case, both magnetization transition instability and large-sized magnetic irregularities occur. FIG. 12E shows the magnetized state of medium E for comparison. In this case, the perpendicular magnetic anisotropy constant Ku of the medium is as large as $2 \times 10^7$ erg/cc, and thus clear magnetic domains with no magnetic irregularity are formed within the DC erased regions 131 and recorded domains 132. However, the magnetic mutual action between magnetic grains is strong, and thus the magnetization transitions 133 have great instability. FIG. 12F shows the magnetized state of medium D for comparison. In this case, the magnetization transition instability is small, and clear magnetic domains can be formed similar to the medium of the invention. However, the magnetic irregularities 134 appear within the recorded domains 132 and DC erased regions 131.

Embodiment 12

One embodiment of magnetic recording apparatus of the invention will be described with reference to FIGS. 13A and 13B.

Figure 13A:
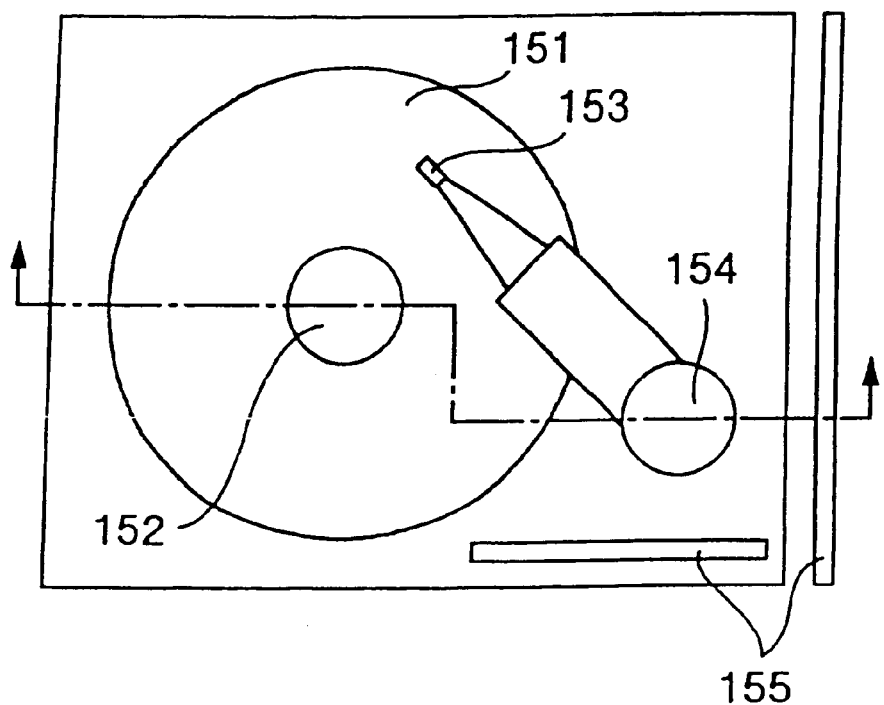
FIG. 13A and FIG. 13B are plan views and cross-sectional view of an embodiment of a magnetic recording apparatus according to the invention.
Figure 13B:
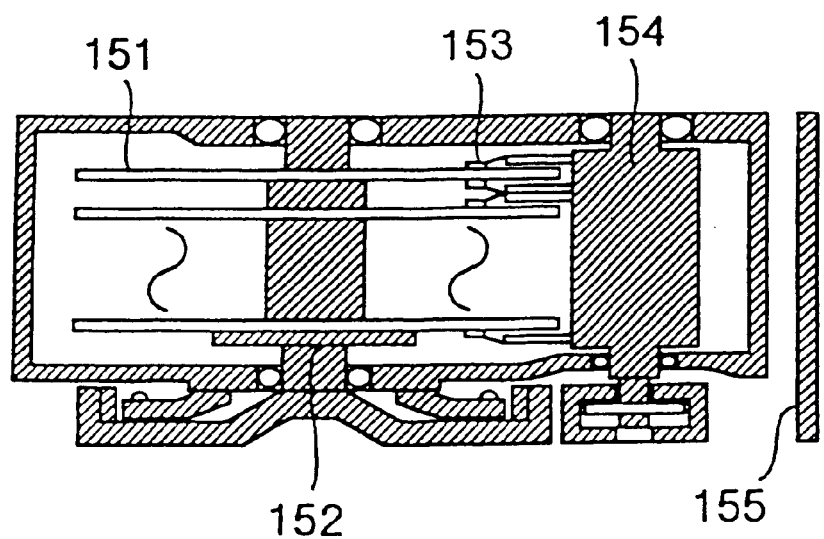

The perpendicular magnetic recording medium produced by way of experiment and the dual head with inductive head for writing and with giant magnetoresistive (GMR) head for reading were used to produce a magnetic recording/reproducing apparatus shown in FIGS. 13A and 13B. Referring to FIGS. 13A and 13B, there are shown a magnetic recording medium 151, a magnetic recording medium drive 152, a magnetic head 153, a magnetic head drive 154, and a signal processor 155.

The magnetic recording medium, or disk 151 was constructed by depositing on a disk-like substrate such as a glass substrate, Si substrate, NiP coated aluminum substrate or carbon substrate, an underlayer for controlling the crystal orientation of a magnetic film, the magnetic film, and then a protective film. A lubricant film was further coated on the protective film. The magnetic film contains chiefly Co, and additionally an element of Cr, Pt, Ti, Ru, Ta, W, Mo, Pd. The magnetic easy axis of the magnetic film was oriented in the direction perpendicular to the substrate surface. In order to obtain the perpendicular recording medium with the magnetic easy axis of the magnetic film oriented in the direction perpendicular to the substrate surface, the underlayer for controlling the structure is made of a material of non-magnetic CoCr alloy, Ti, TiCr alloy or of a polycrystalline or noncrystal material with an element of Pt, Ru, Ta, Mo, Pd added to the non-magnetic alloy to produce hcp structure or an amorphous-like material of Si, Ge.

The magnetic head is constructed by a slider, the magnetic poles of a magnetic write head provided on the slider, and a magnetoresistive, giant magnetoresistive, spin valve effect or magnetic tunnel type element for reading. In order to reduce the magnetization irregularities of the track edges at magnetic writing process, it is desired to align both track edges of trailing and leading side magnetic poles of the write head. Since the track width of the read head is narrower than that of the write head pole, the read back noise from both written track edges can be reduced.

The magnetic head 153 is supported by a suspension 3, and corrected for the yaw angle caused when the magnetic head is moved from the inner periphery side of the disk to the outer periphery side.

The track width of the write head, the track width- of the GMR head sensor for reading, and the spacing between the head and the medium were selected to be 0.4 $\mu$m, 0.32 $\mu$m and 20 nm, respectively. When the apparatus was operated under the conditions of PR 5 system signal processing and 36 Gb/in$^2$ longitudinal recording density, the error rate was less than $1 \times 10^{-9}$.

Thus, according to the invention, as described above, since at least two magnetic films of different perpendicular magnetic anisotropy are formed on the substrate, in which case the perpendicular magnetic anisotropy of the second magnetic film of those magnetic films, far from the substrate surface, is selected to be larger than that of the first magnetic film near to the substrate surface so as to improve the magnetic isolation of the first magnetic film near to the substrate surface, or when a different role is assigned to each magnetic film as they say, the produced magnetic recording media and magnetic recording apparatus can be improved in such a manner that the magnetization transition instability structure and magnetization irregularity structure of the recorded magnetic domains which cause the medium noise can be respectively reduced to be small and completely removed to make the S/N characteristic of the read signal be increased and enough to be suited for ultra-high area density magnetic recording. Particularly, it is possible to make high-density magnetic recording of 5 Gb/in2 or above, and hence to easily produce small-size, large-storage-capacity recording apparatus.

What is claimed is:

1. A perpendicular recording medium comprising:

a substrate, a perpendicular magnetization film, at least one first soft magnetization film formed between the substrate and the perpendicular magnetization film, and a second soft magnetization film formed on said perpendicular magnetization film, wherein a thickness of the second soft magnetization film is less than a thickness of the perpendicular magnetization film, and the thickness of the second soft magnetization film is within a range of 2 nm to 10 nm, and a total thickness of said second soft magnetization film and the perpendicular magnetization film is within a range of 7 nm to 100 nm.

2. The perpendicular recording medium according to claim 1, wherein said second soft magnetization film includes a material selected from the group consisting of permalloy, CoNiZr, FeSi, FeAlSi and CoNbZr.

* * * * *